United States Patent

Yoshioka

[11] Patent Number: 5,857,437
[45] Date of Patent: Jan. 12, 1999

[54] METHOD OF AND APPARATUS FOR CONTINUOUSLY AND VARIABLY CONTROLLING VALVE TIMING OF INTERNAL ENGINE

[75] Inventor: Mamoru Yoshioka, Susono, Japan

[73] Assignee: Toyota Jidosha Kabushiki Kaisha, Aichi, Japan

[21] Appl. No.: 955,692

[22] Filed: Oct. 22, 1997

Related U.S. Application Data

[62] Division of Ser. No. 684,592, Jul. 15, 1996, Pat. No. 5,713,317.

[30] Foreign Application Priority Data

Jul. 26, 1995 [JP] Japan ................................. 7-190524

[51] Int. Cl.⁶ ........................ F02D 13/02; F01L 1/34
[52] U.S. Cl. ..................... 123/90.15; 123/90.17
[58] Field of Search .................. 123/90.15, 90.16, 123/90.17, 90.18, 90.31, 345, 346, 347, 348

[56] References Cited

U.S. PATENT DOCUMENTS

| 4,938,188 | 7/1990 | Seki et al. ........................ 123/333 |
| 5,003,950 | 4/1991 | Kato et al. ........................ 123/422 |
| 5,271,360 | 12/1993 | Kano et al. ........................ 123/90.17 |
| 5,379,744 | 1/1995 | Pischke et al. ..................... 123/571 |
| 5,494,008 | 2/1996 | Ohkawa et al. .................... 123/90.15 |
| 5,590,632 | 1/1997 | Kato et al. ........................ 123/90.15 |

FOREIGN PATENT DOCUMENTS

| 3432379 | 3/1985 | Germany . |
| 3919448 | 12/1989 | Germany . |
| 3924934 | 2/1990 | Germany . |
| 4239773 | 11/1992 | Germany . |
| 3-82845 | 8/1991 | Japan . |
| 3-99844 | 10/1991 | Japan . |
| 4-175430 | 6/1992 | Japan . |
| 2146142 | 4/1985 | United Kingdom . |

*Primary Examiner*—Weilun Lo
*Attorney, Agent, or Firm*—Kenyon & Kenyon

[57] ABSTRACT

A method or an apparatus controls a continuously variable valve timing mechanism of an internal combustion engine to continuously and variably control the timing of an intake valve according to atmospheric pressure. The method or apparatus reads an engine revolution speed NE, an engine load GN, and an atmospheric pressure PA, refers to a map according to the atmospheric pressure PA, to find an atmospheric pressure correction coefficient Kpa, which is 1.0 at low altitudes with PA=760 mmHg and decreases as the altitude increases, i.e., as the atmospheric pressure PA decreases, calculates a corrected engine load GNpa as GNpa←GN/Kpa, and refers to a map according to the corrected engine load GNpa and engine revolution speed NE, to find a target displacement to be imposed on the open/close timing of the intake valve.

2 Claims, 15 Drawing Sheets

Fig. 4

ENGINE REVOLUTION SPEED NE [rpm]

| | 800 | 1200 | 1600 | 2000 | ~ | 6000 | 6400 |
|---|---|---|---|---|---|---|---|
| 0.2 | 0 | 0 | 0 | 0 | ~ | 0 | 0 |
| 0.4 | 0 | 5 | 10 | 10 | ~ | 5 | 5 |
| 0.6 | 5 | 20 | 30 | 30 | ~ | 10 | 10 |
| 0.8 | 20 | 40 | 50 | 50 | ~ | 20 | 20 |
| 1.0 | 35 | 55 | 60 | 60 | ~ | 20 | 20 |
| 1.2 | 40 | 60 | 60 | 60 | ~ | 10 | 10 |
| 1.4 | 30 | 55 | 60 | 60 | ~ | 5 | 5 |
| 1.6 | 30 | 50 | 50 | 50 | ~ | 5 | 5 |
| 1.8 | 30 | 50 | 40 | 40 | ~ | 5 | 0 |
| 2.0 | 30 | 50 | 40 | 40 | ~ | 5 | 0 |

ENGINE LOAD GN [g/rev.]

ated Utility Model Publication No. 3-99844 decreases the
METHOD OF AND APPARATUS FOR CONTINUOUSLY AND VARIABLY CONTROLLING VALVE TIMING OF INTERNAL ENGINE This application is a division of application Ser. No. 08/684,592, filed on Jul. 15, 1996, now U.S. Pat. No. 5,713,317.

BACKGROUND OF THE INVENTION

1. Field of the Invention

The present invention relates to a method of and an apparatus for controlling a continuously variable valve timing mechanism of an internal combustion engine, to continuously and variably control the open/close timing of an intake or exhaust valve of the engine according to a target timing.

2. Description of the Related Art

There are many variable mechanisms that optimize the open/close timing of a valve of an automobile engine according to driving conditions. One of them is an ON/OFF mechanism, which changes the timing of an intake valve of the engine from normal timing to early timing when an engine load exceeds a switching threshold. Japanese Unexamined Utility Model Publication No. 3-99844 decreases the switching threshold or increases a detected engine load in response to a decrease in atmospheric pressure, to optimize the valve timing.

To provide high-performance engines, continuously variable valve timing mechanisms for optimizing valve timing at all times have been developed in place of the ON/OFF mechanisms, as disclosed in Japanese Unexamined Patent Publication No. 4-175430 (corresponding to U.S. Pat. No. 5,271,360). This mechanism continuously changes the open/close timing of a valve, and therefore, never employs the idea of changing the switching threshold in response to a change in atmospheric pressure. There is a requirement, therefore, to provide a method of properly controlling the continuously variable valve timing mechanism.

SUMMARY OF THE INVENTION

An object of the present invention is to provide a method of and an apparatus for optimizing valve timing according to atmospheric pressure for a continuously variable valve timing mechanism of an internal combustion engine.

The present invention intends to improve the output of an engine at high altitudes under high load, as well as reducing fuel consumption and improving exhaust purifying performance at high altitudes under low/medium load. In order to accomplish the objects, the present invention provides the following technical arrangements:

A first aspect of the present invention provides a method of controlling a continuously variable valve timing mechanism of an internal combustion engine, to continuously and variably control the open/close timing of at least one of the intake and the exhaust valves of the engine, including the steps of (a) detecting an engine load, (b) detecting an atmospheric pressure, (c) correcting the detected engine load such that the lower the detected atmospheric pressure the more the engine load is increased, and (d) setting a target valve timing for the valve timing mechanism according to the corrected engine load.

The first aspect also provides an apparatus for controlling valve timing of an internal combustion engine, having a valve timing mechanism for continuously and variably controlling the open/close timing of at least one of the intake and the exhaust valves of the engine, a load detector for detecting an engine load, a pressure detector for detecting an atmospheric pressure, a load corrector for correcting the detected engine load such that the lower the detected atmospheric pressure the more the engine load is increased, and a timing setter for setting a target valve timing for the valve timing mechanism according to the corrected engine load.

A second aspect of the present invention provides a method of controlling a continuously variable valve timing mechanism of an internal combustion engine, to continuously and variably control the open/close timing of at least one of intake and exhaust valves of the engine, including the steps of (a) detecting an engine load, (b) detecting an atmospheric pressure, (c) setting, according to the detected engine load, a displacement from a reference timing as a target valve timing for the valve timing mechanism, and (d) correcting the set displacement such that the lower the detected atmospheric pressure the more the displacement is reduced.

The second aspect also provides an apparatus for controlling valve timing of an internal combustion engine, having a valve timing mechanism for continuously and variably controlling the open/close timing of at least one of intake and exhaust valves of the engine, a load detector for detecting an engine load, a pressure detector for detecting an atmospheric pressure, a displacement setter for setting, according to the detected engine load, a displacement from a reference timing as target valve timing for the valve timing mechanism, and a displacement corrector for correcting the set displacement such that the lower the detected atmospheric pressure the more the set displacement is reduced.

When driving at high altitudes, an engine receives a smaller quantity of intake air due to the low concentration of air. The first and second aspects of the present invention are capable of optimizing valve timing to maintain the output of the engine at high altitudes.

A third aspect of the present invention provides a method including the step of, in addition to the steps of the first aspect, (e) prohibiting the correction in step (c) if the detected engine load is in a low/medium range.

The third aspect also provides an apparatus having, in addition to the components of the first aspect, a prohibition unit for prohibiting the correction carried out by the load corrector if the detected engine load is in a low/medium range.

The first aspect corrects an engine load in any range according to atmospheric pressure to maintain the output of the engine when driving at high altitudes. If such a correction is carried out under a low/medium engine load, the quantity of internally recirculated exhaust gas of an internal exhaust gas recirculation (EGR) system will increase excessively to cause incomplete combustion. The internal EGR system is employed to improve exhaust gas purifying performance and reduce pumping loss and fuel consumption. Accordingly, the third aspect prohibits the engine load correction under a low/medium engine load, thereby preventing an excessive amount of exhaust gas being recirculated.

A fourth aspect of the present invention provides a method including the step of, in addition to the steps of the first aspect, (e) correcting the target valve timing set in step (d) to an intermediate value between the target valve timing and valve timing determined according to the detected engine load, if the detected engine load is in a low/medium range.

The fourth aspect also provides an apparatus having, in addition to the components of the first aspect, a timing corrector for correcting the target valve timing set by the timing setter to an intermediate value between the target valve timing and valve timing determined according to the engine load detected by the load detector, if the detected engine load is in a low/medium range.

The third aspect simply prohibits the engine load correction according to atmospheric pressure if the engine load is in a low/medium range. When driving at high altitudes, the negative pressure of an intake duct of the engine decreases to reduce the quantity of internally recirculated exhaust gas. Accordingly, the fourth aspect corrects the engine load according to atmospheric pressure, to optimize the quantity of recirculated internal exhaust gas at high altitudes under the low/medium engine load.

BRIEF DESCRIPTION OF THE DRAWINGS

Further features and advantages of the present invention will be apparent from the following description with reference to the accompanying drawings, in which:

FIG. 4 is a map used to determine a displacement to be imposed on the open/close timing of an intake valve according to the revolution speed and load of an engine (the load being represented by the mass of intake air per revolution);

DESCRIPTION OF THE PREFERRED EMBODIMENTS

The embodiments of the present invention will be explained with reference to the drawings.

Figure 1:
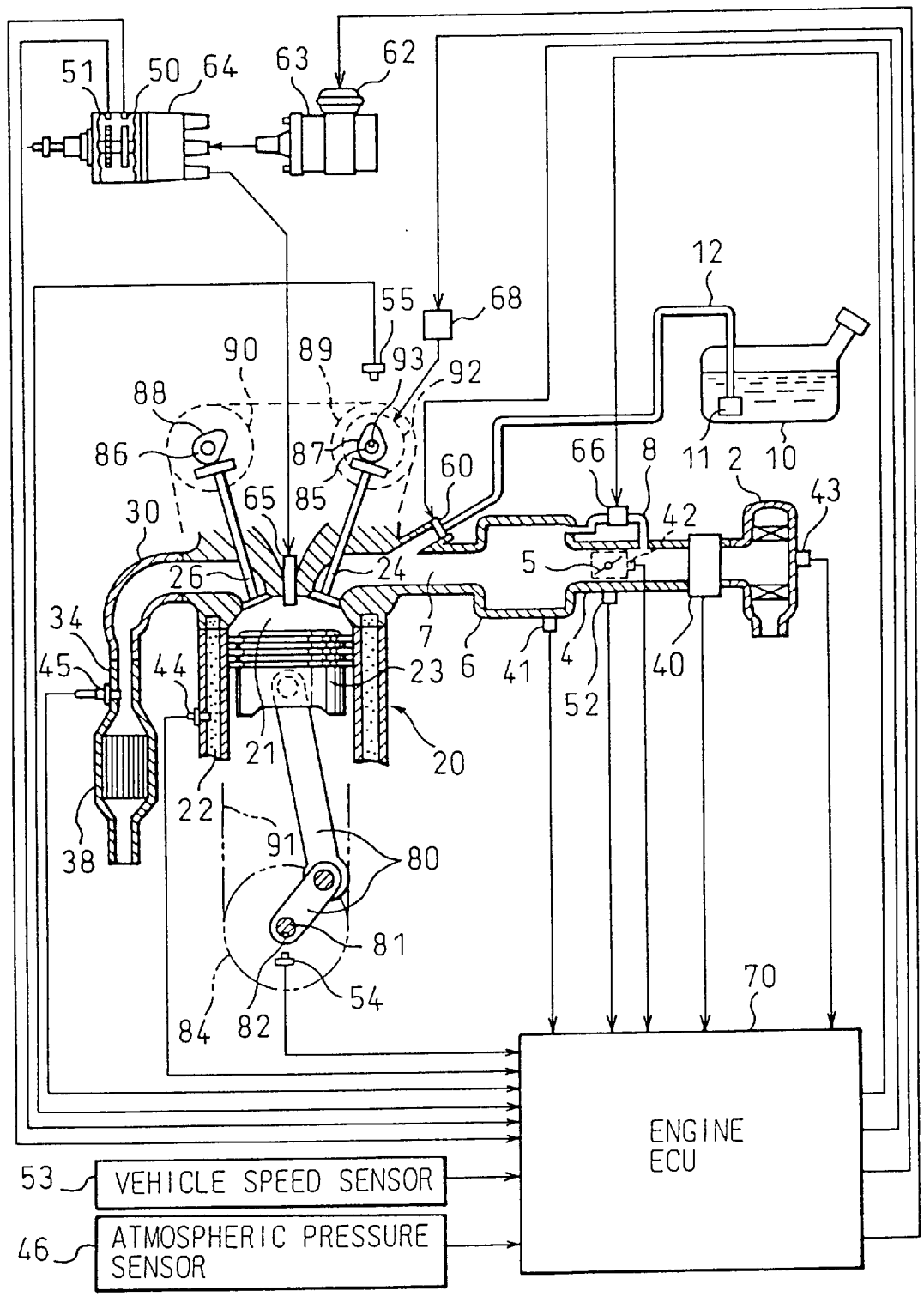
FIG. 1 is a general view showing an electronically controlled internal combustion engine having an apparatus for continuously and variably controlling valve timing according to an embodiment of the present invention.

FIG. 1 is a general view showing an electronically controlled internal combustion engine having an apparatus for continuously and variably controlling the open/close timing of a valve according to an embodiment of the present invention. An air cleaner 2 filters air necessary for combustion, a throttle body 4 passes the air, and a surge tank (intake manifold) 6 distributes the air to an intake duct 7 of each cylinder. A throttle valve 5 arranged in the throttle body 4 adjusts the quantity of intake air. An airflow meter 40 measures the mass flow rate of intake air. A temperature sensor 43 detects the temperature of intake air. A vacuum sensor 41 detects the pressure of the intake duct 7. An atmospheric pressure sensor 46 is arranged so that it is not influenced by wind pressure during driving.

A throttle sensor 42 detects the opening of the throttle valve 5. When the throttle valve 5 is completely closed, an idle switch 52 is turned on to generate a throttle closed signal. An idling adjusting path 8 bypasses the throttle valve 5 and has an idling speed control valve (ISCV) 66 for adjusting an airflow rate during an idling period.

Fuel in a fuel tank 10 is pumped up by a fuel pump 11, is passed through a fuel pipe 12, and is injected by a fuel injector 60.

The intake duct 7 mixes fuel with air, and the air-fuel mixture is drawn into a combustion chamber 21 of a cylinder 20 through an intake valve 24. The air-fuel mixture is compressed by a piston 23, ignited, exploded, and combusted to produce power. Namely, an igniter 62 generates an ignition signal to control a primary current of an ignition coil 63. A secondary current of the ignition coil 63 is supplied to a spark plug 65 through an ignition distributor 64, to thereby ignite the air-fuel mixture in the combustion chamber 21.

The ignition distributor 64 has a reference position sensor 50 and a crank angle sensor 51. The reference position sensor 50 generates a reference position pulse for every 720 degrees of crank angle. The crank angle sensor 51 generates a position pulse for every 30 degrees of crank angle. A vehicle speed sensor 53 generates a pulse representing an actual running speed. A cooling water path 22 guides cooling water to cool the engine 20. A water temperature sensor 44 detects the temperature of the cooling water.

An exhaust valve 26 discharges an exhaust gas of the combusted air-fuel mixture into an exhaust manifold 30 connected to an exhaust pipe 34. The exhaust pipe 34 has an $O_2$ sensor 45 to detect the concentration of oxygen in the exhaust gas. A catalytic converter 38 is arranged in the exhaust pipe 34 downstream from the sensor 45. The catalytic converter 38 contains a three-way catalyst for promoting the oxidization of unburned components such as HC and CO as well as the reduction of nitrogen oxides ($NO_x$). The purified exhaust gas from the catalytic converter 38 is discharged outside.

A mechanism for opening and closing the intake valve 24 and exhaust valve 26 will be explained. The piston 23 is connected to a crankshaft 81 through a connecting rod 80. An end of the crankshaft 81 has a timing pulley 84. The intake valve 24 is driven by a cam 87 attached to a cam shaft 85. The exhaust valve 26 is driven by a cam 88 attached to a cam shaft 86. An end of the cam shaft 85 has a timing pulley 89. An end of the cam shaft 86 has a timing pulley 90. The timing pulleys 89 and 90 are connected to the timing pulley 84 through a timing belt 91. As a result, the crankshaft 81 drives the cam shafts 85 and 86 to open and close the intake valve 24 and exhaust valve 26 at predetermined crank angles. The crank shaft 81 has a buried magnet 82, so that a first magnetic sensor 54 arranged close to the crankshaft 81 may generate a reference pulse. The cam shaft 85 of the intake valve 24 has a buried magnet 93, so that a second magnetic sensor 55 arranged close to the cam shaft 85 may generate a reference pulse.

A continuously variable mechanism 92 having a known structure to determine the open/close timing of the intake valve 24 is arranged between the cam shaft 85 and the timing pulley 89. The mechanism 92 turns the cam shaft 85 and timing pulley 89 relative to each other. More precisely, the mechanism 92 uses the cam shaft 85 and timing pulley 89 as external gears and connects them to each other through an intermediate helical gear. The helical gear is axially moved by hydraulic pressure, to drive the cam shaft 85 and timing pulley 89 relative to each other. The hydraulic pressure is controlled by a control valve 68.

Figure 2:
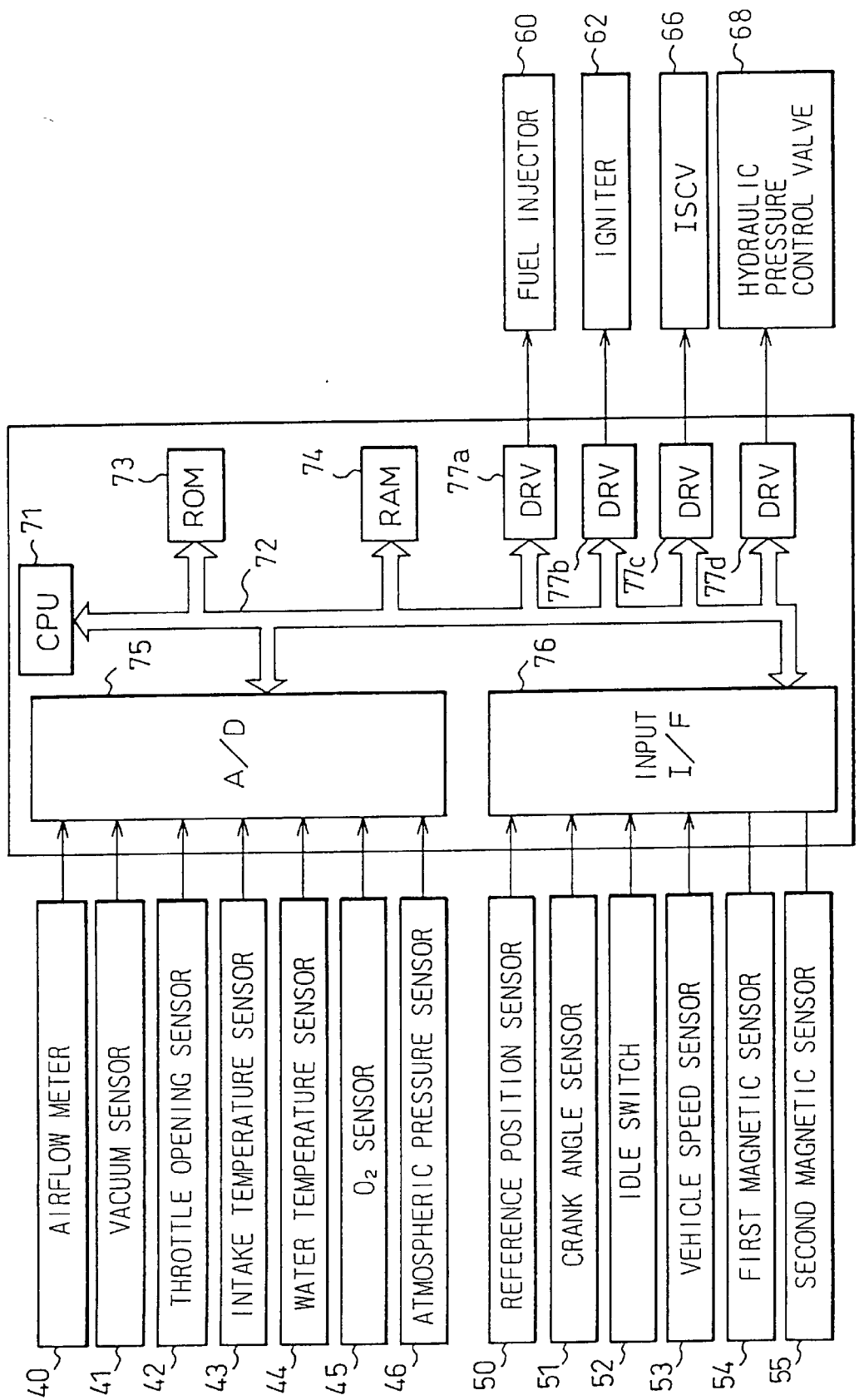
FIG. 2 is a block diagram showing an electronic engine control unit according to the embodiment.

An electronic engine control unit (ECU) 70 is a microcomputer to control fuel injection, ignition timing, idling speed, and in addition, the open/close timing of a valve according to the present invention. FIG. 2 is a block diagram showing the hardware of the control unit 70. A read-only memory (ROM) 73 stores programs and maps. A central processing unit (CPU) 71 receives signals from the sensors and switches through an A/D converter 75 and an interface 76, processes the signals, and provides actuator control signals through drive control circuits 77a to 77d. A random-access memory (RAM) 74 temporarily stores data during the operation of the CPU 71. These elements are connected to one another through a system bus 72 containing address, data, and control buses.

An engine control process carried out by the control unit 70 will be explained.

Fuel injection control refers to the mass of intake air per engine revolution, calculates the fuel injection quantity, i.e., injection period of the fuel injector 60 to achieve a target air-fuel ratio, and instructs the drive control circuit 77a to inject fuel from the fuel injector 60 at a given crank angle. The mass of intake air per engine revolution is calculated according to the mass flow rate of intake air measured by the airflow meter 40 and an engine revolution speed detected by the crank angle sensor 51. Alternatively, it is estimated according to the pressure of the intake duct 7 detected by the vacuum sensor 41 and the engine revolution speed. The fuel injection quantity is subjected to corrections such as a basic correction according to signals from the throttle sensor 42, intake temperature sensor 43, water temperature sensor 44, etc., an air-fuel ratio feedback correction according to a signal from the O₂ sensor 45, and an air-fuel ratio learning correction to equalize a central feedback correction value with a theoretical air-fuel ratio.

Ignition timing control collectively checks engine conditions according to an engine revolution speed detected by the crank angle sensor 51 and signals from other sensors, calculates optimum ignition timing, and provides an ignition signal to the igniter 62 through the drive control circuit 77b.

Idling speed control detects an idling state according to a throttle closed signal from the idle switch 52 and a vehicle speed signal from the vehicle speed sensor 53, calculates a target revolution speed according to the temperature of cooling water measured by the water temperature sensor 44, compares the target speed with an actual revolution speed, determines a control quantity to attain the target revolution speed according to the difference between the target and actual revolution speeds, and controls the idling speed control valve 66 through the drive control circuit 77c, to thereby adjust the quantity of air and optimize the idling speed.

Valve timing control sets the target open/close timing of the intake valve 24 according to operating conditions and controls the continuously variable mechanism 92. More precisely, the hydraulic pressure control valve 68 is feedback-controlled according to signals from the first and second magnetic sensors 54 and 55 so that the cam shaft 85 of the intake valve 24 maintains a required rotational phase with respect to the crankshaft 81. The valve timing control according to the present invention will be explained in detail.

Figure 3:
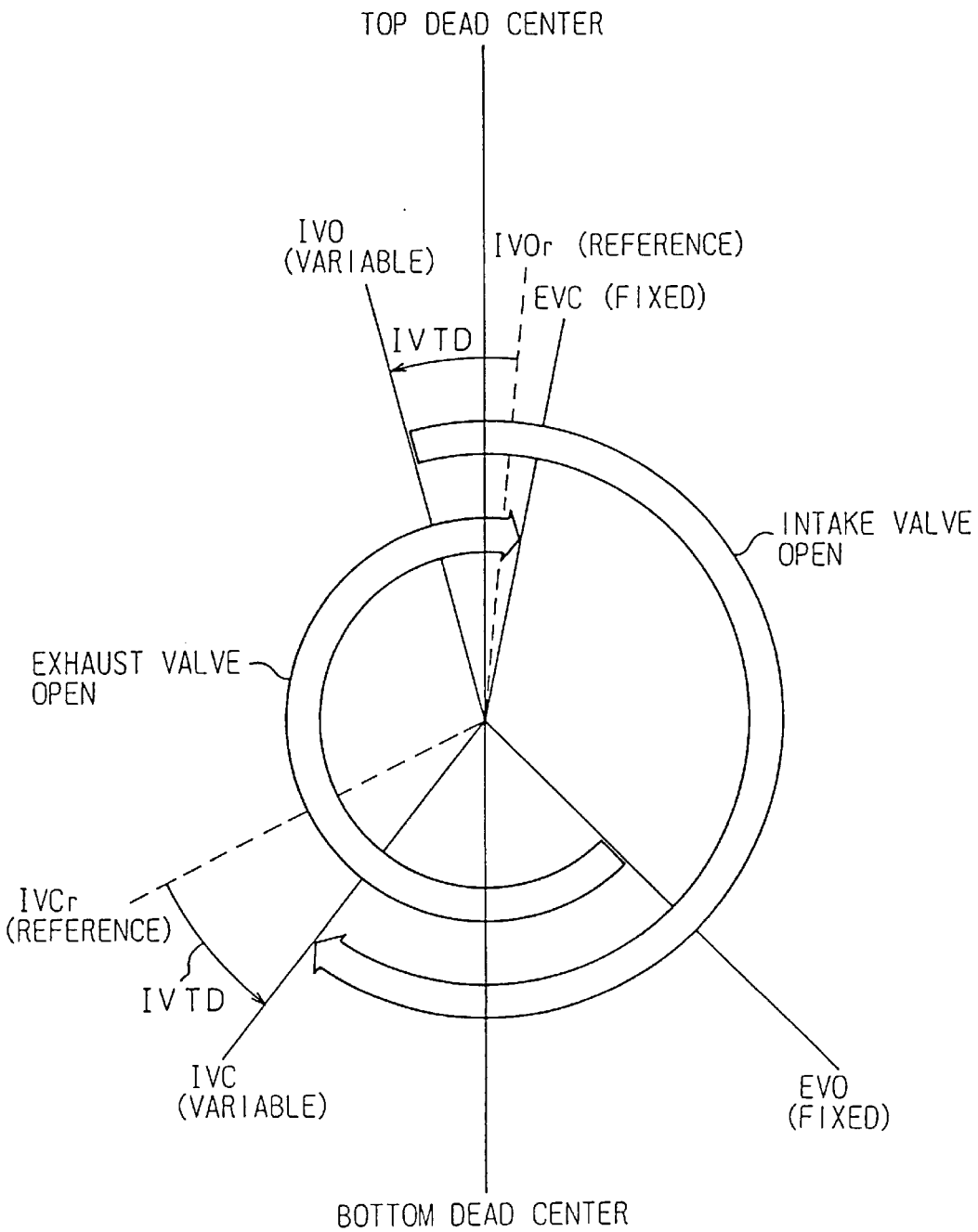
FIG. 3 is a timing chart showing crank angles representing the open/close timing of intake and exhaust valves.

FIG. 3 is a timing chart showing crank angles corresponding to the open/close timing of the intake and exhaust valves 24 and 26. The exhaust valve 26 is opened at fixed valve open timing EVO, for example, 50 degrees before a bottom exhaust dead center and is closed at fixed valve close timing EVC, for example, 3 degrees after a top exhaust dead center. On the other hand, the intake valve 24 involves a fixed open period and variable valve opening timing IVO and valve close timing IVC. The most delayed timing IVOr and IVCr of the intake valve 24 serve as reference positions. The open/close timing of the intake valve 24 is optionally set at positions ahead of the reference positions. A valve timing displacement IVTD serves as a control target quantity. The reference valve open timing IVOr is, for example, 3 degrees after the top exhaust dead center, and the reference valve close timing IVCr is, for example, 65 degrees after a bottom intake dead center. If the displacement IVTD is equal to a crank angle of 30 degrees, the valve open timing IVO is 27 degrees before the top exhaust dead center, and the valve close timing IVC is 35 degrees after the bottom intake dead center.

FIG. 4 is a map used to determine a displacement IVTD for optimizing the open/close timing of the intake valve 24. The displacement IVTD is determined according to an engine revolution speed NE and an engine load GN, i.e., the mass of intake air per engine revolution.

Figure 5:
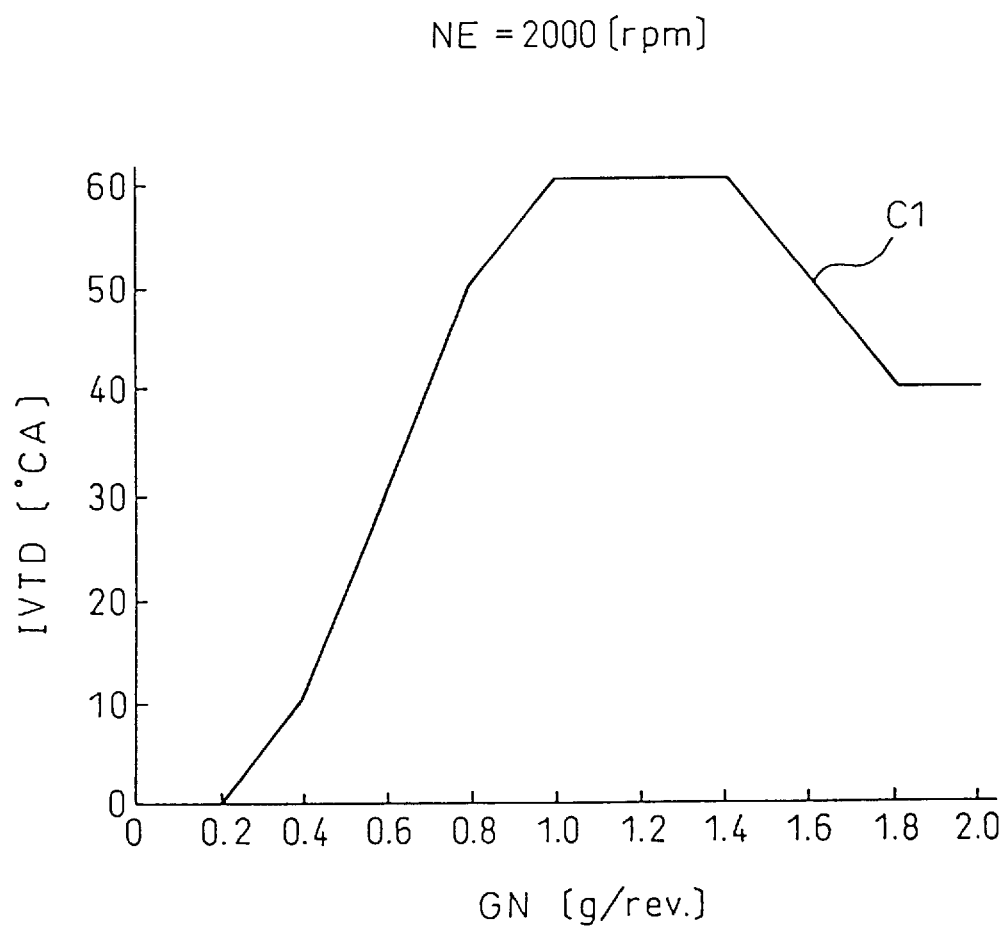
FIG. 5 is a graph showing the relationship between an engine load and a target displacement to be imposed on the open/close timing of an intake valve at an engine speed (NE) of 2000 rpm.

FIG. 5 is a graph showing the relationship between an engine load GN and a displacement IVTD with NE=2000 rpm. In a low/medium range (GN<=1.2 g/rev), a valve overlapping period in which the intake and exhaust valves are both open is increased to increase the quantity of internally recirculated exhaust gas, to thereby improve exhaust gas purifying performance and decrease a pumping loss to reduce fuel consumption. To achieve this, the displacement IVTD is gradually increased. In a high range (GN>=1.2 g/rev), the displacement IVTD is adjusted to improve the output of the engine. When GN=2.0 g/rev corresponding to a full throttle condition, the displacement IVTD is set to a crank angle of 40 degrees.

Values of FIGS. 4 and 5 are for low altitudes. At high altitudes, air concentration is low to reduce the quantity of intake air. When driving at low altitudes with NE=2000 rpm and if the throttle valve 5 is fully opened, the quantity of intake air is 2.0 g/rev as shown in FIG. 5. Namely, if GN=2.0 g/rev, it is determined that the throttle valve 5 is fully opened and that high output is required. To meet the requirement, the displacement IVTD is set to 40 degrees in crank angle. At high altitudes, the quantity of intake air is, for example, 1.6 g/rev even if the throttle valve 5 is fully opened. If the displacement IVTD is calculated normally under this situation, it will be 50 degrees in crank angle as shown in FIG. 5. This displacement will never provide high output. It is preferable to set IVTD=40 degrees in crank angle at high altitudes if the throttle valve 5 is fully opened. High-altitude corrections of atmospheric pressure and air concentration will be explained according to four embodiments of the present invention.

Figure 6:
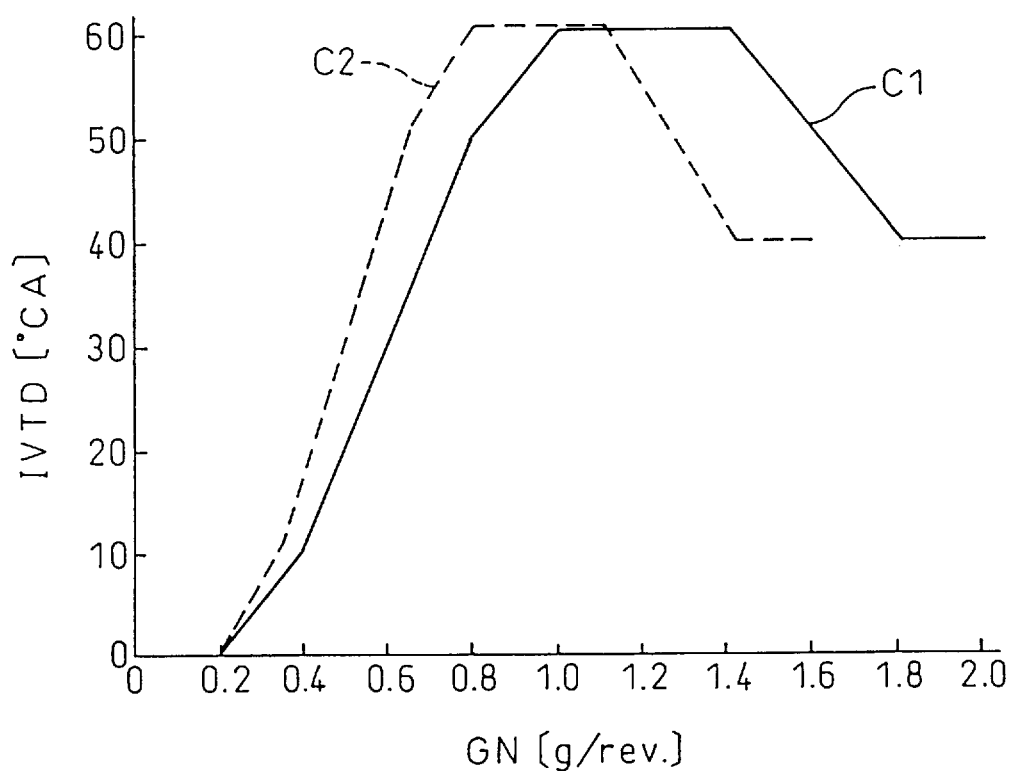
FIG. 6 is a graph explaining a correction of an engine load according to atmospheric pressure according to a first embodiment of the present invention.

The first embodiment according to the first aspect of the present invention will be explained. The first embodiment increases an engine load as a detected atmospheric pressure becomes lower, to maintain the output of the engine at high altitudes under a high load. A curve C1 of FIG. 6, which is equal to the curve C1 of FIG. 5, is proper when driving at low altitudes. Atmospheric pressure is low at high altitudes, and therefore, the present invention employs a curve C2 of FIG. 6 to correct an engine load GN.

Figure 7:
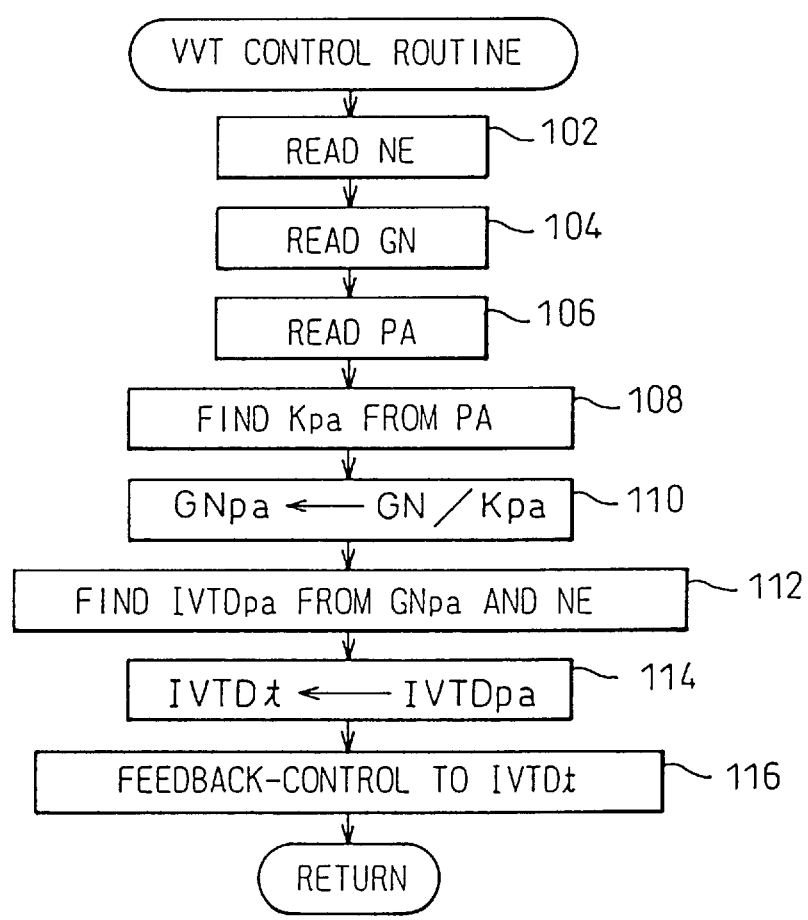
FIG. 7 is a flowchart showing a routine of variably controlling the open/close timing of a valve according to the first embodiment.

FIG. 7 is a flowchart showing a variable valve timing (VVT) control routine according to the first embodiment. This routine is carried out regularly. Step 102 reads an engine revolution speed NE calculated according to the output of the crank angle sensor 51. Step 104 reads an engine load (the mass of intake air per engine revolution) calculated according to the mass flow rate of intake air detected by the airflow meter 40 and the engine revolution speed provided by the crank angle sensor 51. Step 106 reads an atmospheric pressure PA detected by the atmospheric pressure sensor 46.

Figure 8:
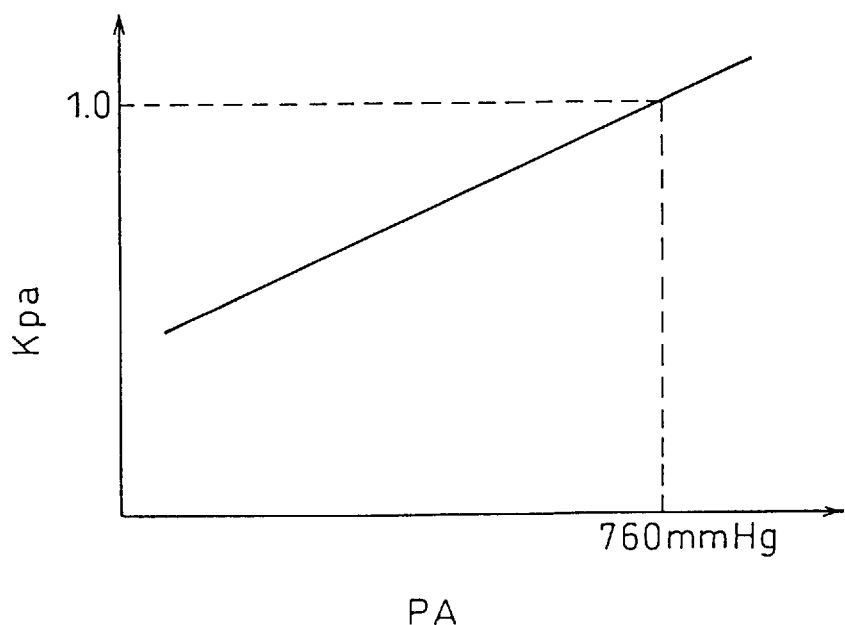
FIG. 8 is a map used to determine an atmospheric pressure correction coefficient Kpa according to an engine load GN.

Step 108 refers to a map of FIG. 8 according to the atmospheric pressure PA and finds an atmospheric pressure (air concentration) correction coefficient Kpa. The coefficient Kpa is 1.0 at low altitudes with PA=760 mmHg and decreases as the altitude increases, i.e., as the atmospheric pressure PA decreases. The map of FIG. 8 is stored in the ROM 73 in advance. Step 110 calculates an engine load GNpa after the atmospheric pressure correction as follows:

$$GNpa \leftarrow GN/Kpa$$

Step 112 refers to the map of FIG. 4 according to the engine load GNpa and engine revolution speed NE, to find a displacement IVTDpa to be imposed on the open/close timing of the intake valve 24. The map of FIG. 4 is also stored in the ROM 73 in advance.

Step 114 sets the displacement IVTDpa as a target displacement IVTDt. To bring an actual displacement to the target displacement IVTDt, signals from the first and second magnetic sensors 54 and 55 are monitored to feedback-control the hydraulic pressure control valve 68.

Figure 9:
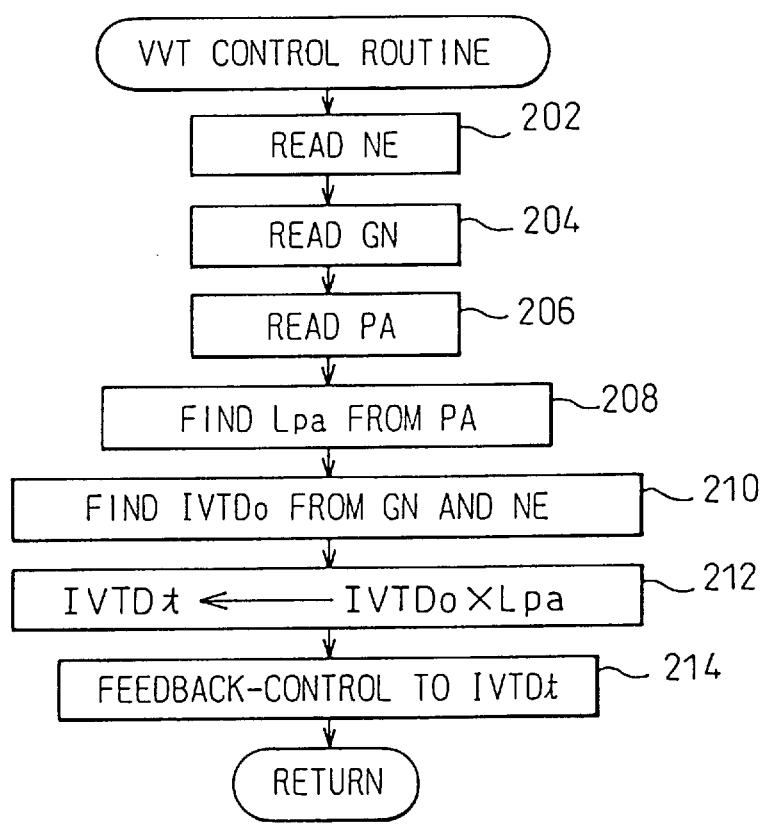
FIG. 9 is a flowchart showing a routine of variably controlling the open/close timing of a valve according to a second embodiment of the present invention.

The second embodiment according to the second aspect of the present invention will be explained. The second embodiment sets a target displacement to be imposed on the open/close timing of the intake valve 24 according to a detected engine load and decreases the target displacement as an atmospheric pressure becomes lower, to maintain the output of the engine at high altitudes under high load, similar to the first embodiment. FIG. 9 is a flowchart showing a variable valve timing (VVT) control routine according to the second embodiment. Steps 202 to 206 are the same as steps 102 to 106 of the first embodiment of FIG. 7.

Figure 10:
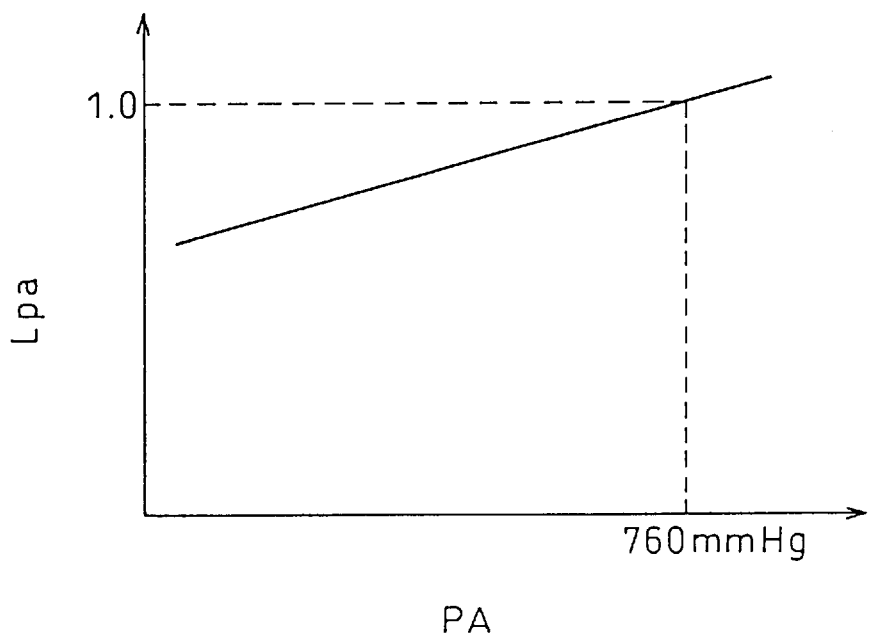
FIG. 10 is a map used to determine an atmospheric pressure correction coefficient Lpa according to a displacement to be imposed on the open/close timing of an intake valve.

Step 208 refers to a map of FIG. 10 according to the atmospheric pressure PA and finds a correction coefficient Lpa for correcting a displacement to be imposed on the open/close timing of the intake valve 24. The correction coefficient Lpa is 1.0 at low altitudes with PA=760 mmHg and decreases as the altitude increases, i.e., as the atmospheric pressure PA decreases. The map of FIG. 10 is stored in the ROM 73 in advance. Step 210 refers to the map of FIG. 4 according to the engine load GN and engine revolution speed NE and finds a displacement IVTD0 to be imposed on the open/close timing of the intake valve 24.

Step 212 corrects the displacement IVTD0 and provides a target displacement IVTDt as follows:

$$IVTDt \leftarrow IVTD0 \times Lpa$$

To bring the actual displacement of the intake valve 24 to the target displacement IVTDt, the hydraulic control valve 68 is feedback-controlled.

Figure 11:
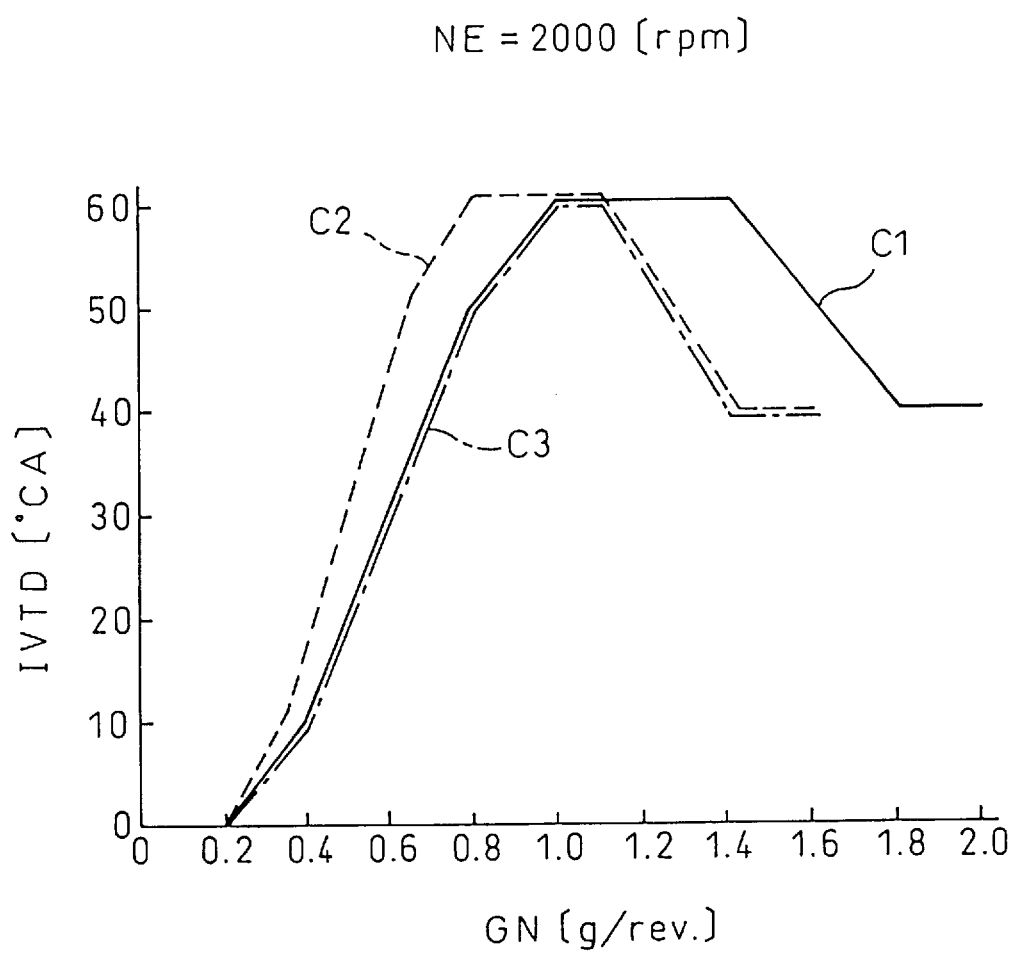
FIG. 11 is a graph explaining a correction of an engine load according to atmospheric pressure according to a third embodiment of the present invention.

The third embodiment according to the third aspect of the present invention will be explained. The first embodiment corrects an engine load in any range according to atmospheric pressure. If this correction is made when the engine load is in a low/medium range, a valve overlapping period increases to excessively increase the quantity of internally recirculated exhaust gas, to deteriorate combustion. Accordingly, the third embodiment prohibits the engine load correction based on atmospheric pressure if the engine load is in the low/medium range. As indicated with a curve C3 of FIG. 11, the third embodiment largely corrects an engine load when the engine load is in a high range with atmospheric pressure being low. However, it carries out no correction if the engine load is in the low/medium range. Curves C1 and C2 of FIG. 11 correspond to the curves C1 and C2 of FIG. 6.

Figure 12:
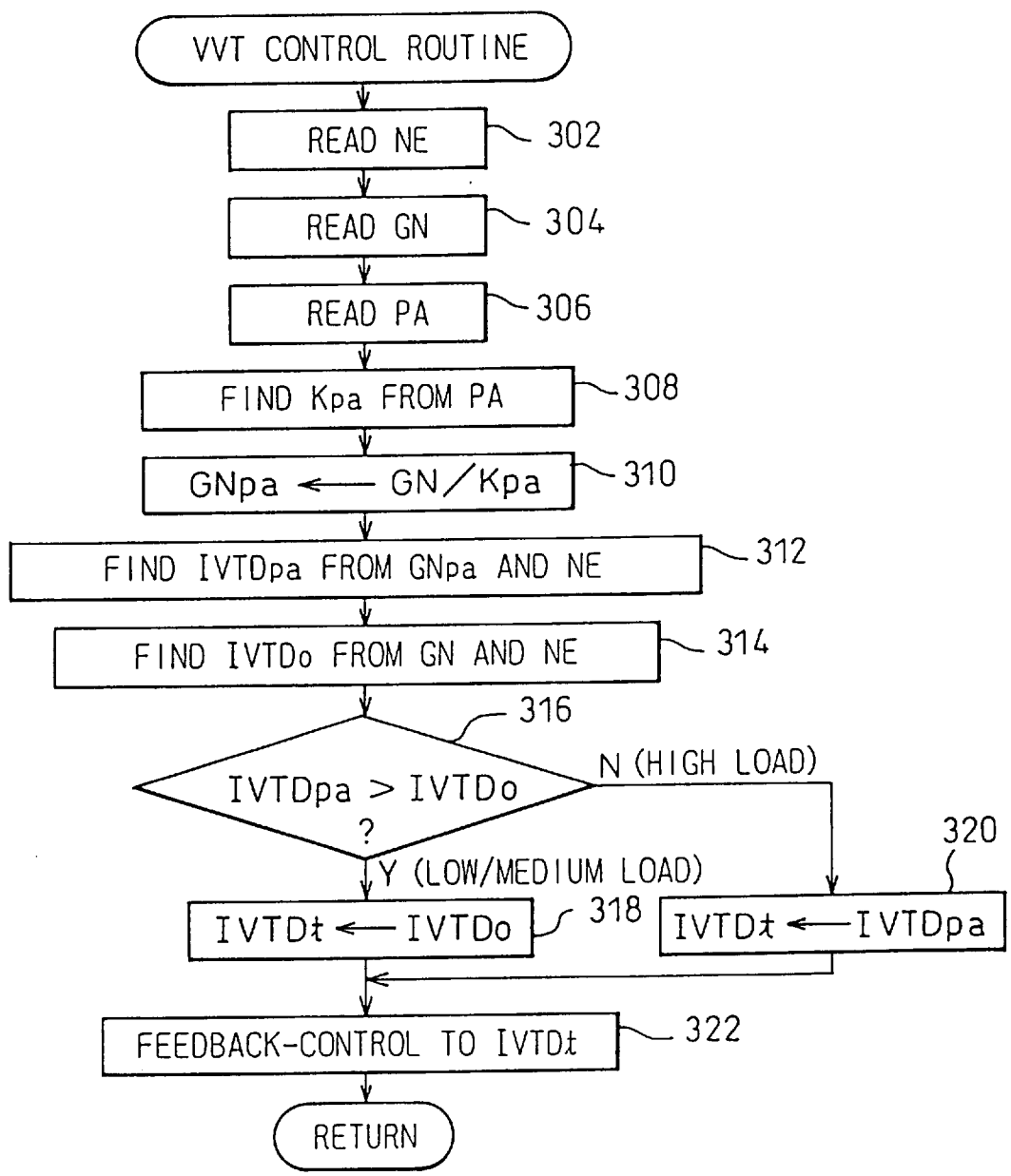
FIG. 12 is a flowchart showing a routine of variably controlling the open/close timing of a valve according to the third embodiment.

FIG. 12 is a flowchart showing a variable valve timing (VVT) control routine according to the third embodiment. Steps 302 to 312 are the same as steps 102 to 112 of the first embodiment of FIG. 7. Step 314 refers to the map of FIG. 4 according to the engine load GN and engine revolution speed NE and finds a displacement IVTD0 to be imposed on the open/close timing of the intake valve 24.

Figure 13:
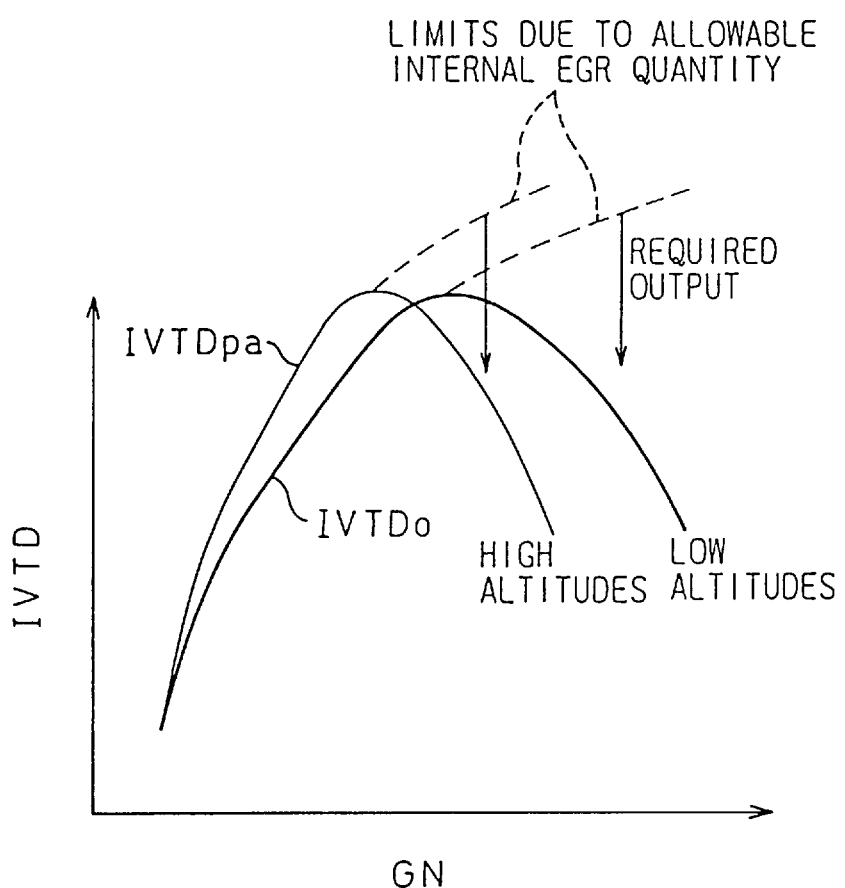
FIG. 13 is a graph showing the relationship between an engine load and a displacement to be imposed on the open/close timing of an intake valve at low altitudes (IVTD0) and high altitudes (IVTDpa)

Step 316 compares the displacement IVTDpa of step 312 with the displacement IVTD0 of step 314 and determines whether the engine load is in a low/medium range or in a high range. The reason why this comparison can determine a load range will be explained. As a displacement to be imposed on the open/close timing of the intake valve 24 increases, the quantity of internally recirculated exhaust gas increases, and an allowable quantity of internally recirculated exhaust gas increases as the engine load increases. Accordingly, a maximum valve timing displacement is in the high load range in principle. However, if the maximum valve timing displacement is kept until the throttle valve 5 is fully opened, combustion will deteriorate to lower the output of the engine. Accordingly, the valve timing displacement is adjusted to realize a required engine output in the high load range. As a result, the displacement map has a maximum in the middle load range. This is the reason why the displacement IVTDpa corrected for high altitudes is compared with the displacement IVTD0 without correction, as shown in FIG. 13. Then, it is determined as follows:

if IVTDpa>IVTD0 then engine load is in low/medium range if IVTDpa<=IVTD0 then engine load is in high range If it is determined that it is in the low/medium range, step 318 sets the displacement IVTD0 as a target displacement IVTDt. If it is determined that it is in the high range, step 320 sets the displacement IVTDpa as the target displacement IVTDt. Step 322 feedback-controls the hydraulic pressure control valve 68 according to the target displacement IVTDt.

Figure 14:
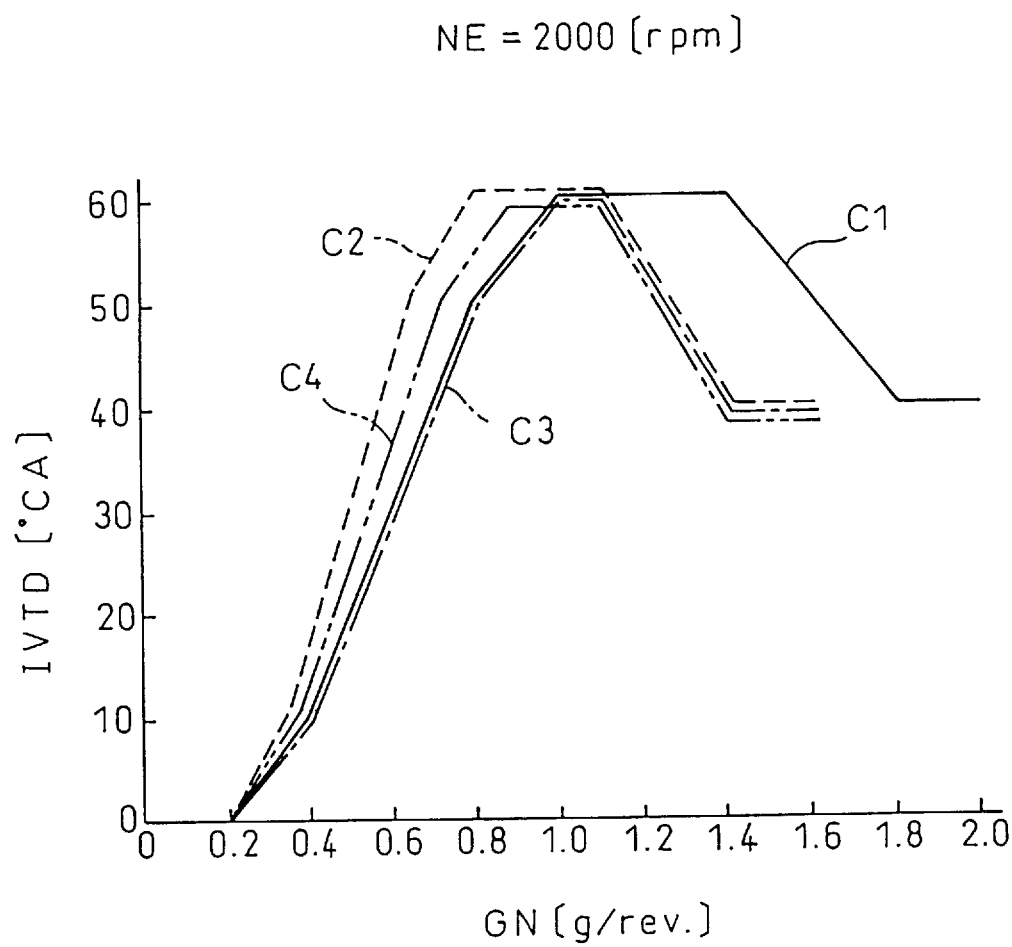
FIG. 14 is a graph explaining a correction of an engine load according to atmospheric pressure according to a fourth embodiment of the present invention.

The fourth embodiment according to the fourth aspect of the present invention will be explained. The third embodiment only prohibits the engine load correction according to atmospheric pressure if the engine load is in the low/medium range. The quantity of internally recirculated exhaust gas decreases at high altitudes due to a decrease in the negative pressure of the intake duct 7, and the fourth embodiment considers this in correcting the engine load to optimize the quantity of internally recirculated exhaust gas in the low/medium range. As indicated with a curve C4 of FIG. 14, the engine load is corrected between the curve C2 of the first embodiment and the curve C3 of the third embodiment when the engine load is in the low/medium range. Curves C1, C2, and C3 of FIG. 14 correspond to the curves C1, C2, and C3 of FIG. 11.

Figure 15:
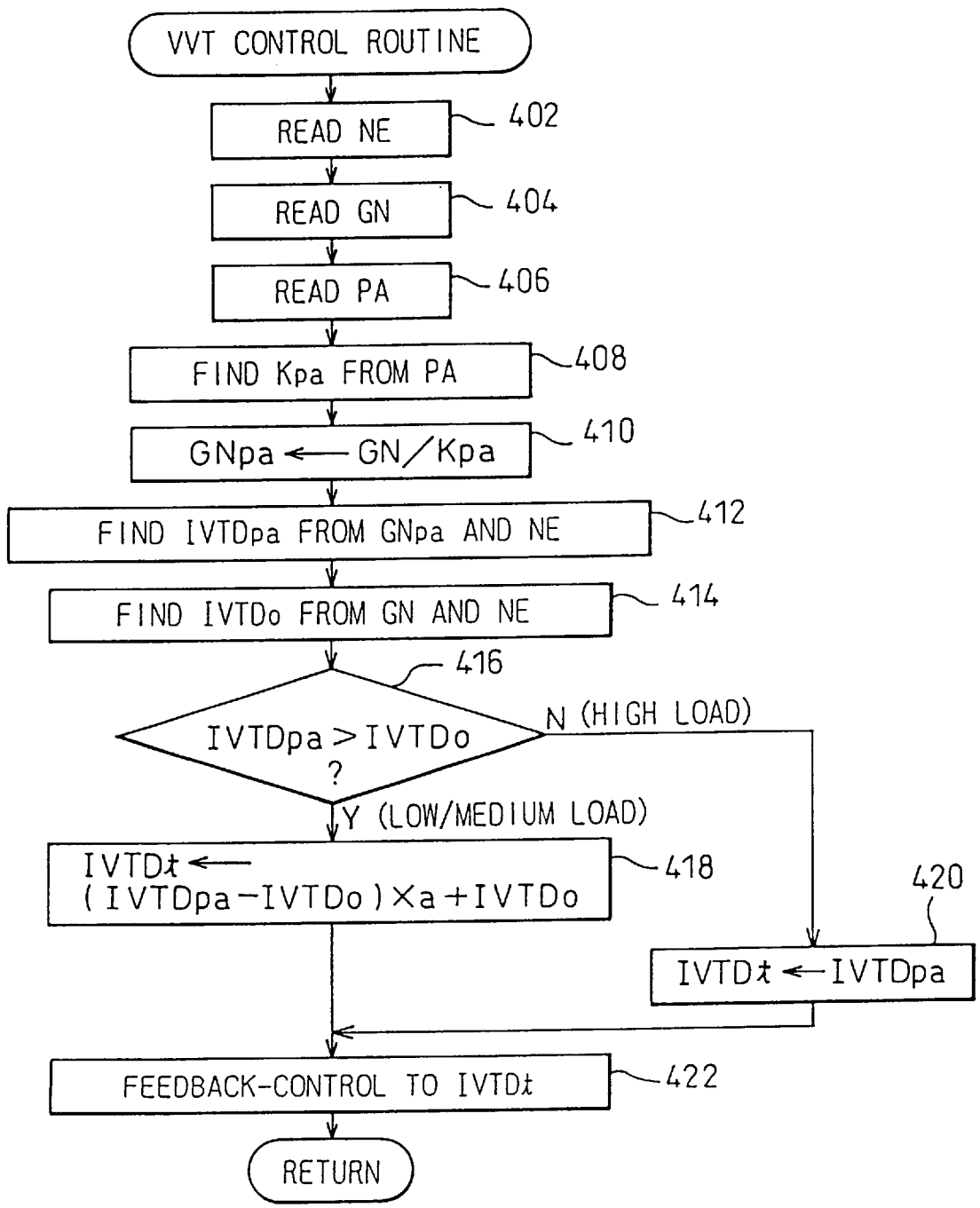
FIG. 15 is a flowchart showing a routine of variably controlling the open/close timing of a valve according to the fourth embodiment.

FIG. 15 is a flowchart showing a variable valve timing (VVT) control routine according to the fourth embodiment. What is different from the third embodiment of FIG. 12 is only step 418 corresponding to step 318 of the third embodiment. Namely, step 418 sets a target displacement to be imposed on the open/close timing of the intake valve 24 when the engine load is in the low/medium range as follows:

$$IVTDt \leftarrow (IVTDpa - IVTD0) \times a + IVTD0$$

(a=0.5, for example)

The fourth embodiment optimizes the quantity of internally recirculated exhaust gas at high altitudes with the engine load being in the high or low/medium range, similar to driving at low altitudes.

Each of the above embodiments uses the two-dimensional map of engine load and engine revolution speed, to continuously control the open/close timing of the intake valve both at low and high highlands, thereby smoothing the torque characteristics with respect to the engine load and the throttle opening.

Although the present invention has been described by way of embodiments, it is apparent to those skilled in the art that other embodiments and modifications of the present invention are possible without departing from the spirit or essential features thereof. For example, the electronic engine control unit 70 used by each embodiment to variably control valve timing may be a dedicated electronic control unit. Although the embodiments variably control the open/close timing of the intake valve 24, the present invention is naturally applicable to control the exhaust valve 26, too. An engine load may be represented with the pressure of the intake duct 7.

As explained above, the present invention provides a method of and apparatus for setting optimum valve timing according to atmospheric pressure for a continuous variable valve timing mechanism of an internal combustion engine. The first and second aspects of the present invention are capable of setting optimum valve timing to maintain the output of the engine at high altitudes. The first aspect corrects an engine load in any range according to atmospheric pressure to maintain the output of the engine. If such a correction is carried out under a low/medium engine load, the quantity of internally recirculated exhaust gas of the internal EGR system will increase excessively to cause incomplete combustion. The internal EGR system is employed to improve exhaust gas purifying performance and reduce a pumping loss and fuel consumption.

Accordingly, the third aspect of the present invention prohibits the engine load correction if it is in a low/medium range, thereby preventing an excessive exhaust gas to be recirculated and, at the same time, the third aspect is also capable of maintaining the output of the engine at high altitudes under a high load. The fourth aspect of the present invention maintains the output of the engine at high altitudes under a high load and corrects an engine load according to atmospheric pressure at high altitudes under a low/medium load in consideration of a decrease in the quantity of internally recirculated exhaust gas, thereby optimizing the quantity of internally recirculated exhaust gas at high altitudes.

What is claimed is:

1. A method of controlling a continuously variable valve timing mechanism of an internal combustion engine, to continuously and variably control an opening and closing timing of at least one of intake and exhaust valves of the engine, comprising the steps of:

(a) preparing a map for determining a displacement from a reference timing as a target valve timing according to an engine load, in which map a valve overlapping period in which both an intake and an exhaust valve are open is set smaller in a high load range than in a medium load range, the valve overlapping period being the smallest for the reference timing;

(b) detecting an engine load;

(c) detecting an atmospheric pressure;

(d) referring to the map to set the displacement according to the detected engine load; and (e) correcting the set displacement such that the lower the detected atmospheric pressure the more the set displacement is reduced.

2. An apparatus for controlling valve timing of an internal combustion engine, comprising:

a valve timing mechanism for continuously and variably controlling an opening and closing timing of at least one of intake and exhaust valves of the engine;

a control map for determining a displacement from a reference timing as a target valve timing according to an engine load, in which map a valve overlapping period in which both an intake and an exhaust valve are open is set smaller in a high load range than in a medium load range, the valve overlapping period being the smallest for the reference timing;

load detection means for detecting an engine load;

pressure detection means for detecting an atmospheric pressure;

displacement set means for setting the displacement by referring to the map according to the detected engine load; and displacement correction means for correcting the set displacement such that the lower the detected atmospheric pressure the more the set displacement is reduced.

* * * * *